(12) United States Patent
Prazot Ofenburg et al.

(10) Patent No.: US 11,809,062 B2
(45) Date of Patent: Nov. 7, 2023

(54) ADDING A FLOATING ANALOG VOLTAGE SIGNAL OVER A REFERENCE ANALOG VOLTAGE SIGNAL

(71) Applicant: Applied Materials Israel Ltd., Rehovot (IL)

(72) Inventors: Shem Yehoyda Prazot Ofenburg, Jerusalem (IL); Pavel Komissarov, Rehovot (IL)

(73) Assignee: Applied Materials Israel Ltd., Rehovot (IL)

( * ) Notice: Subject to any disclaimer, the term of this patent is extended or adjusted under 35 U.S.C. 154(b) by 0 days.

(21) Appl. No.: 17/709,260

(22) Filed: Mar. 30, 2022

(65) Prior Publication Data
US 2023/0314901 A1 Oct. 5, 2023

(51) Int. Cl.
*G02F 7/00* (2006.01)
*H04B 10/564* (2013.01)
*H04B 10/69* (2013.01)

(52) U.S. Cl.
CPC .............. *G02F 7/00* (2013.01); *H04B 10/564* (2013.01); *H04B 10/69* (2013.01)

(58) Field of Classification Search
CPC .......... G02F 7/00; H04B 10/564; H04B 10/69; H04B 10/50; H04B 10/572; H04B 10/2931; H04B 10/293; G02B 26/02; H01S 5/06808
See application file for complete search history.

(56) References Cited

U.S. PATENT DOCUMENTS

| | | | |
|---|---|---|---|
| 4,856,011 A * | 8/1989 | Shimada | H01S 5/042 315/149 |
| 5,548,435 A * | 8/1996 | Tahara | H04B 10/564 372/38.07 |
| 6,201,635 B1 * | 3/2001 | Yamanaka | H04B 10/2931 359/337 |
| 6,670,610 B2 | 12/2003 | Shemesh et al. | |
| 8,709,269 B2 | 4/2014 | Shemesh | |
| 11,101,105 B1 | 8/2021 | Mets | |
| 2011/0213227 A1 * | 9/2011 | Ziv | A61B 5/0002 600/323 |
| 2018/0040119 A1 * | 2/2018 | Trenholm | G06T 7/41 |
| 2020/0025247 A1 * | 1/2020 | Miki | H02K 49/108 |

* cited by examiner

*Primary Examiner* — Hibret A Woldekidan
(74) *Attorney, Agent, or Firm* — Kilpatrick Townsend & Stockton LLP

(57) ABSTRACT

A method and a system for adding a floating analog voltage signal over a reference analog voltage signal. The system and the method may accurately control the value of the floating analog voltage signal—using an optical feedback path, and may directly add the floating analog voltage signal over the reference analog voltage signal.

13 Claims, 2 Drawing Sheets

ADDING A FLOATING ANALOG VOLTAGE SIGNAL OVER A REFERENCE ANALOG VOLTAGE SIGNAL

BACKGROUND OF THE INVENTION

A floating analog voltage signal may be required to float over a reference analog voltage signal. The provision of such a floating analog voltage signal may be problematic when the reference analog voltage signal is a high voltage signal (for example—may be exceed one thousand volts) that is carried over a conduit that has a low capacitance. The low capacitance may be required for safety reasons. The low capacitance of the conduit increases the impedance of the conduit and increases the coupling between the floating analog voltage signal and the a reference analog voltage signal. Due to the increased impedance, floating analog voltage signal noises may result in a significant common mode noise of the reference analog voltage signal.

There is a growing need to provide an effective system and method for adding a floating analog voltage signal over a reference analog voltage signal.

BRIEF SUMMARY OF THE INVENTION

There may be provided a method and a system for adding a floating analog voltage signal over a reference analog voltage signal.

There may be provided a method for adding a floating analog voltage signal over a reference analog voltage signal, the method may include (i) outputting a forward analog voltage signal, by an analog control unit; (ii) converting, by a forward electrical signal to light converter, the forward analog voltage signal to a forward optical analog signal; (iii) sending the forward optical analog signal over a forward optical path and to an optical splitter; (iv) splitting, by the optical splitter, the forward optical analog signal to (a) a backward optical analog signal, and (b) a main part optical analog signal; (vii) converting the main part optical analog signal to the floating analog voltage signal, wherein the converting is executed by a forward light to electrical signal converter; (viii) adding the floating analog voltage signal to the reference analog voltage signal to provide an output analog voltage signal; (ix) sending the backward optical analog signal via an optical feedback path to a backward light to electrical signal converter; (x) converting the backward optical analog signal to a feedback analog voltage; wherein the converting is executed by the backward light to electrical signal converter; (xi) feeding the feedback analog voltage signal to the analog control unit; and (xii) setting a value of the forward analog voltage signal based on the feedback analog voltage.

There may be provided a system for adding a floating analog voltage signal over a reference analog voltage signal, the system may include (i) a control unit that is configured to output a forward analog voltage signal; (ii) a forward electrical signal to light converter that is configured to convert the forward analog voltage signal to a forward optical analog signal; (iii) an optical splitter that is configured to split the forward optical analog signal to (a) a backward optical analog signal that is sent via an optical feedback path to a backward light to electrical signal converter, and (b) a main part optical analog signal; (iv) a forward light to electrical signal converter that is configured to convert the main part optical analog signal to the floating analog voltage signal; (v) an adder that is configured to add the floating analog voltage signal to the reference analog voltage signal to provide an output analog voltage signal; (vi) a backward light to electrical signal converter that is configured to convert the backward optical analog signal to a feedback analog voltage; and (vii) wherein the control unit is also configured to receive the analog control unit, and to set a value of the forward analog voltage signal based on the feedback analog voltage.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings in which:

DETAILED DESCRIPTION OF THE INVENTION

Figure 1:
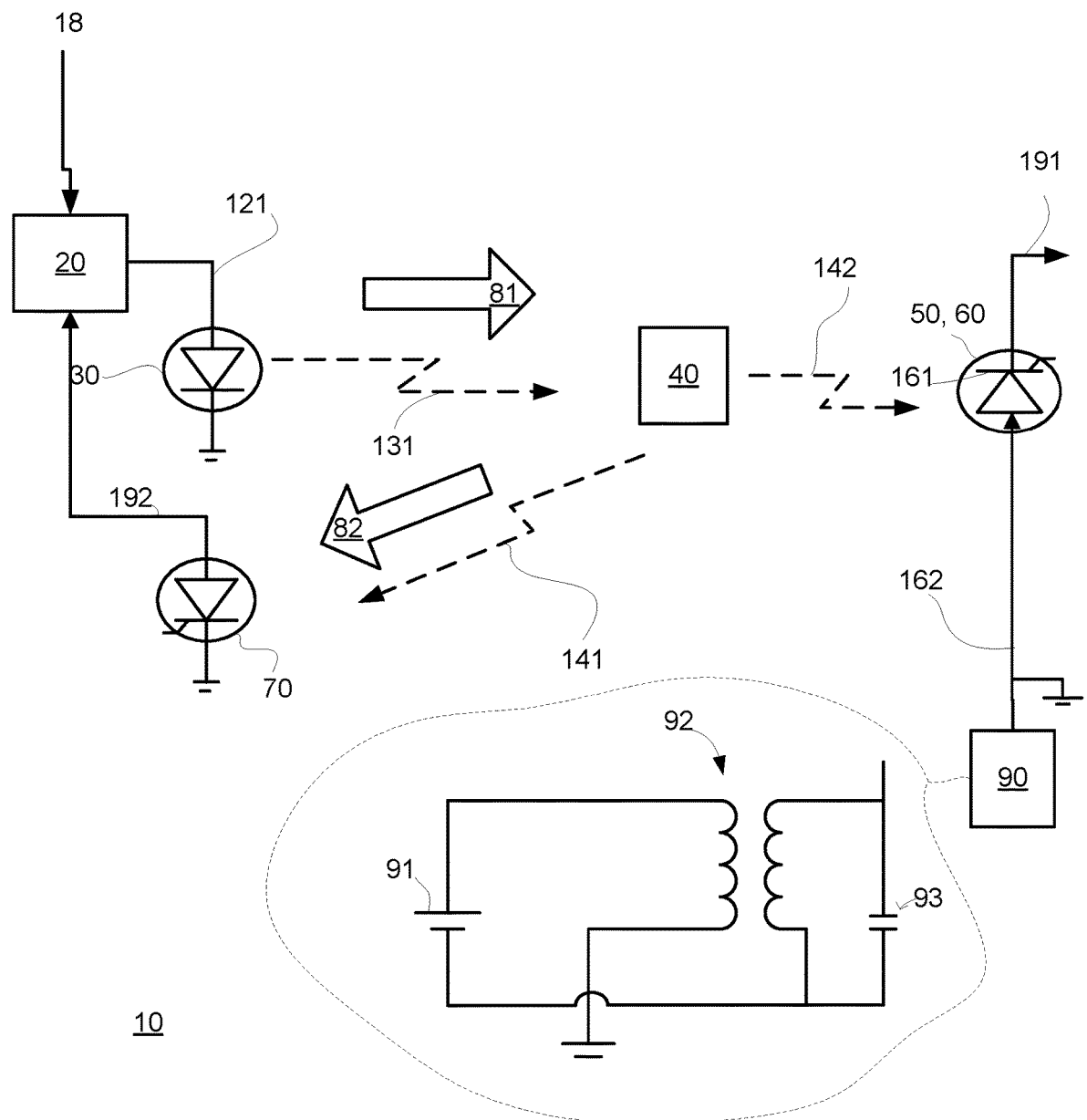
FIG. 1 illustrates an example of a system.

In the following detailed description, numerous specific details are set forth in order to provide a thorough understanding of the embodiments of the disclosure.

However, it will be understood by those skilled in the art that the present embodiments of the disclosure may be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure Any reference in the specification to a method should be applied mutatis mutandis to a system capable of executing the method.

Any reference in the specification to a system should be applied mutatis mutandis to a method that may be executed by the system.

The term "and/or" means additionally or alternatively.

There may be provided a method and a system for adding a floating analog voltage signal over a reference analog voltage signal. The system and the method may accurately control the value of the floating analog voltage signal using an optical feedback path, and may directly add the floating analog voltage signal over the reference analog voltage signal.

The optical feedback path is used to convey a backward optical analog signal that is converted to a feedback analog voltage. The feedback analog voltage signal is provided to a control unit that is configured to set a value of a forward analog voltage signal based on the feedback analog voltage.

The term forward means towards the output of the system. The term backwards means towards the input of the system.

FIG. 1 illustrates an example of a system 10 that may include a control unit 20, a forward electrical signal to light converter 30, an optical splitter 40, a forward light to electrical signal converter 50, an adder 60, a backward light to electrical signal converter 70, an optical forward path 81 and an optical feedback path 82.

The control unit 20 is configured to output a forward analog voltage signal 121.

The forward electrical signal to light converter 30 is configured to convert the forward analog voltage signal 121 to a forward optical analog signal 131.

The optical splitter 40 is configured to split the forward optical analog signal 131 to (a) a backward optical analog signal 141 and to (b) a main part optical analog signal 142.

The backward optical analog signal 141 that is sent via optical feedback path 82 to the backward light to electrical signal converter 70.

The forward optical analog signal 131 may be conveyed over the optical forward path before reaching the optical splitter.

The forward light to electrical signal converter 50 is configured to convert the main part optical analog signal 142 to floating analog voltage signal 161.

The adder 60 is configured to add the floating analog voltage signal 161 to the reference analog voltage signal 162 to provide an output analog voltage signal 191.

The backward light to electrical signal converter 70 is configured to convert the backward optical analog signal 141 to a feedback analog voltage signal 192.

The control unit 20 may also be configured to receive the feedback analog voltage signal 192 and to set a value of the forward analog voltage signal 121 based on the feedback analog voltage signal 192. Any control scheme may be applied by the control unit 20.

The value of the floating analog voltage signal 161 may be a fraction (for example up to 0.1, 0.5, 1, 5, 10 percent and the like) of a value of the reference analog voltage signal.

The value of reference analog voltage signal exceeds one thousand volts.

FIG. 1 also illustrates reference analog voltage signal generator 90 that is configured to provide the reference analog voltage signal 162. In FIG. 1 the reference analog voltage signal generator 90 is illustrated as including a direct current (DC) low power supply 91, a DC to DC converter 92, and an output stage that may include output capacitor 93. The output stage is in communication with (for example over an electrical path) with a floating ground, and with the adder 60. In FIG. 1 the adder 60 and the forward light to electrical signal converter 50 are merged.

FIG. 1 also illustrates a control signal 18 that is sent to control unit 20 and sets a desired value of the floating analog voltage signal.

Figure 2:
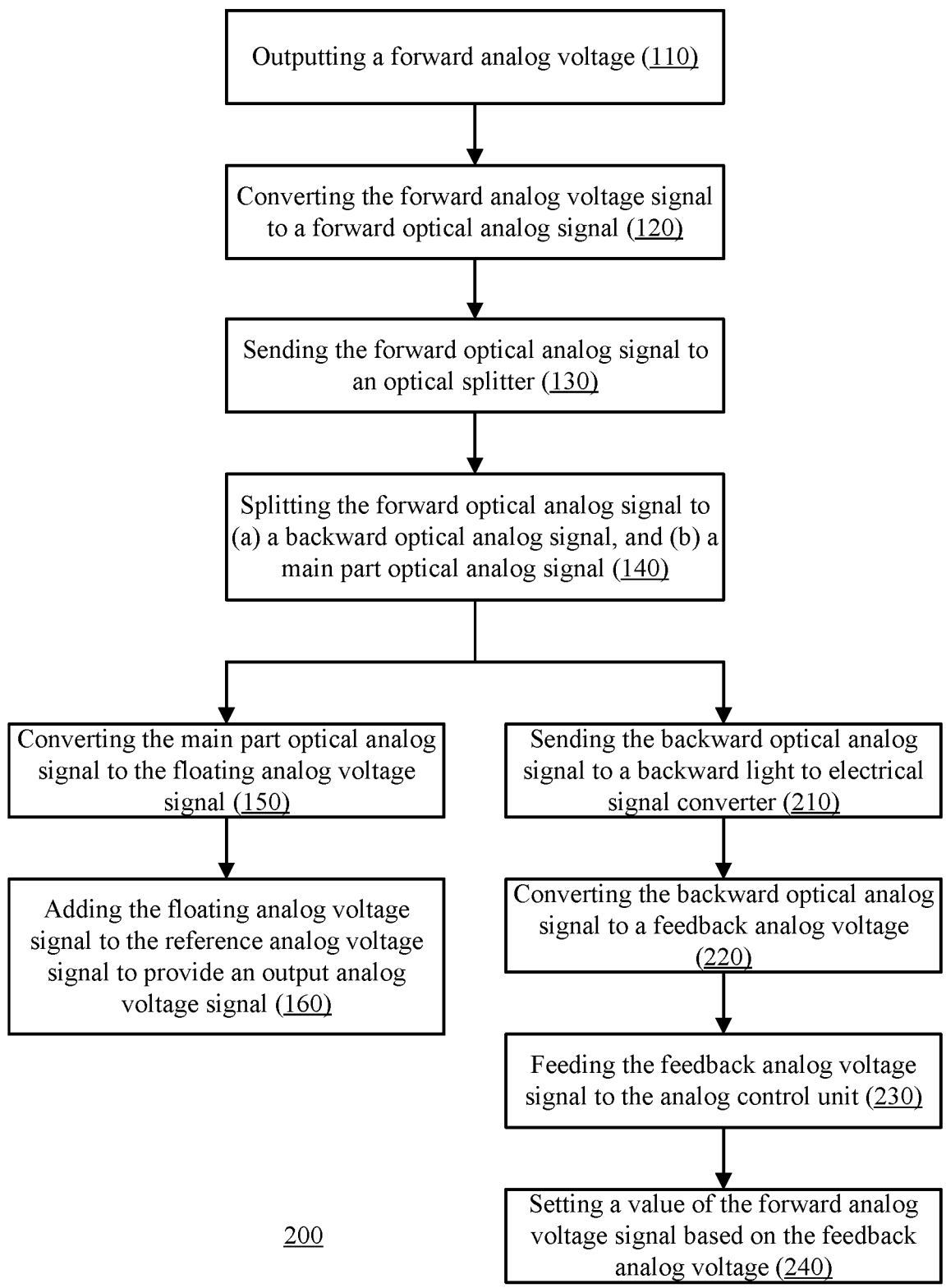
FIG. 2 illustrates an example of a method.

FIG. 2 illustrates an example of method 200 for adding a floating analog voltage signal over a reference analog voltage signal.

Method 200 may start by step 110 of outputting a forward analog voltage signal by an analog control unit.

Step 110 may be followed by step 120 of converting, by a forward electrical signal to light converter, the forward analog voltage signal to a forward optical analog signal.

Step 120 may be followed by step 130 of sending the forward optical analog signal over a forward optical path and to an optical splitter.

Step 130 may be followed by step 140 of splitting, by the optical splitter, the forward optical analog signal to (a) a backward optical analog signal, and (b) a main part optical analog signal.

Step 140 may be followed by step 150 and step 210.

Step 150 may include converting the main part optical analog signal to the floating analog voltage signal, wherein the converting is executed by a forward light to electrical signal converter.

Step 150 may be followed by step 160 of adding the floating analog voltage signal to the reference analog voltage signal to provide an output analog voltage signal.

Step 160 may include or may be preceded by providing the reference analog voltage signal over an electrical path that is isolated from the optical feedback path.

Step 210 may include sending the backward optical analog signal via an optical feedback path to a backward light to electrical signal converter.

Step 210 may be followed by step 220 of converting the backward optical analog signal to a feedback analog voltage; wherein the converting is executed by the backward light to electrical signal converter.

Step 220 may be followed by step 230 of feeding the feedback analog voltage signal to the analog control unit.

Step 230 may be followed by step 240 of setting a value of the forward analog voltage signal based on the feedback analog voltage.

The floating analog signal may be a fraction of a value of the reference analog voltage signal.

The value of the reference analog voltage signal may exceed one thousand volts.

Step 240 and even method 200 may be executed without providing feedback regarding the output analog voltage signal.

Step 240 and even method 200 may be executed without directly amending the output analog voltage signal.

Step 240 and even method 200 may be executed without providing feedback regarding the output analog voltage signal.

Step 240 and even method 200 may be executed without measuring the output analog voltage signal.

In the foregoing specification, the embodiments of the disclosure has been described with reference to specific examples of embodiments of the disclosure. It will, however, be evident that various modifications and changes may be made therein without departing from the broader spirit and scope of the embodiments of the disclosure as set forth in the appended claims.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments of the disclosure containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the embodiments of the disclosure.

Any combination of any module or unit listed in any of the figures, any part of the specification and/or any claims may be provided. Especially any combination of any claimed feature may be provided.

Any reference to the term "comprising" or "having" should be interpreted also as referring to "consisting" of "essentially consisting of". For example—a method that comprises certain steps can include additional steps, can be limited to the certain steps or may include additional steps that do not materially affect the basic and novel characteristics of the method—respectively.

The foregoing specification, includes specific examples of one or more embodiments. It will, however, be evident that various modifications and changes may be made therein without departing from the broader spirit and scope of the one or more embodiments as set forth in the appended claims.

What is claimed is:

1. A method for adding a floating analog voltage signal over a reference analog voltage signal, the method comprising:
   outputting a forward analog voltage signal by an analog control unit;
   converting, by a forward electrical signal to light converter, the forward analog voltage signal to a forward optical analog signal;
   sending the forward optical analog signal over a forward optical path and to an optical splitter;
   splitting, by the optical splitter, the forward optical analog signal to (a) a backward optical analog signal and (b) a main part optical analog signal;
   converting the main part optical analog signal to the floating analog voltage signal, wherein the converting is executed by a forward light to electrical signal converter;
   adding the floating analog voltage signal to the reference analog voltage signal to provide an output analog voltage signal;
   sending the backward optical analog signal via an optical feedback path to a backward light to electrical signal converter;
   converting the backward optical analog signal to a feedback analog voltage, wherein the converting is executed by the backward light to electrical signal converter;
   feeding the feedback analog voltage signal to the analog control unit; and
   setting a value of the forward analog voltage signal based on the feedback analog voltage;
   wherein a value of the floating analog signal is a fraction of a value of the reference analog voltage signal.

2. The method according to claim 1 wherein the value of reference analog voltage signal exceeds one thousand volts.

3. The method according to claim 1 comprising providing the reference analog voltage signal over an electrical path that is isolated from the optical feedback path.

4. The method according to claim 1 wherein the setting of the value of the forward analog voltage signal is executed without providing feedback regarding the output analog voltage signal.

5. The method according to claim 1 wherein the setting of the value of the forward analog voltage signal is executed without directly amending the output analog voltage signal.

6. The method according to claim 1 wherein the setting of the value of the forward analog voltage signal is executed without providing feedback regarding the output analog voltage signal.

7. The method according to claim 1 wherein the setting of the value of the forward analog voltage signal is executed without measuring the output analog voltage signal.

8. A system for adding a floating analog voltage signal over a reference analog voltage signal, the system comprising:
   a control unit that is configured to output a forward analog voltage signal;
   a forward electrical signal to light converter that is configured to convert the forward analog voltage signal to a forward optical analog signal;
   an optical splitter that is configured to split the forward optical analog signal to (a) a backward optical analog signal that is sent via an optical feedback path to a backward light to electrical signal converter, and (b) a main part optical analog signal;

a forward light to electrical signal converter that is configured to convert the main part optical analog signal to the floating analog voltage signal;

an adder that is configured to add the floating analog voltage signal to the reference analog voltage signal to provide an output analog voltage signal;

a backward light to electrical signal converter that is configured to convert the backward optical analog signal to a feedback analog voltage; and wherein the control unit is also configured to receive the analog control unit, and to set a value of the forward analog voltage signal based on the feedback analog voltage wherein a value of the floating analog signal is a fraction of a value of the reference analog voltage signal.

9. The system according to claim 8 wherein the value of reference analog voltage signal exceeds one thousand volts.

10. The system according to claim 8 comprising a reference analog voltage signal generator that is configured to provide the reference analog voltage signal over an electrical path that is isolated from the optical feedback path.

11. The system according to claim 8 wherein the control unit is configured to set the value of the forward analog voltage signal without having the system directly amend the output analog voltage signal.

12. The system according to claim 8, wherein the control unit is configured to set the value of the forward analog voltage signal without having the system provide feedback regarding the output analog voltage signal.

13. The system according to claim 8 wherein the control unit is configured to set the value of the forward analog voltage signal without having the system measure the output analog voltage signal.

* * * * *